Oct. 6, 1970 P. CHOFFART 3,532,943

SEMICONDUCTOR COMPONENT WITH ADDITIONAL INSULATING BAND

Filed May 21, 1968

United States Patent Office 3,532,943

Patented Oct. 6, 1970

3,532,943

SEMICONDUCTOR COMPONENT WITH ADDITIONAL INSULATING BAND

Pierre Choffart, Massy, Seine-et-Oise, France, assignor to Compagnie Generale d'Electricite, Paris, France, a corporation of France Filed May 21, 1968, Ser. No. 730,705
Claims priority, application France, May 24, 1967, 107,707
Int. Cl. H01l 1/02
U.S. Cl. 317—234 4 Claims

ABSTRACT OF THE DISCLOSURE

Reinforcing the outer insulation of a semiconductor device by superimposing an additional insulating band between and partially over the electrodes, whereby the breakdown voltage is substantially increased.

Figure 1:
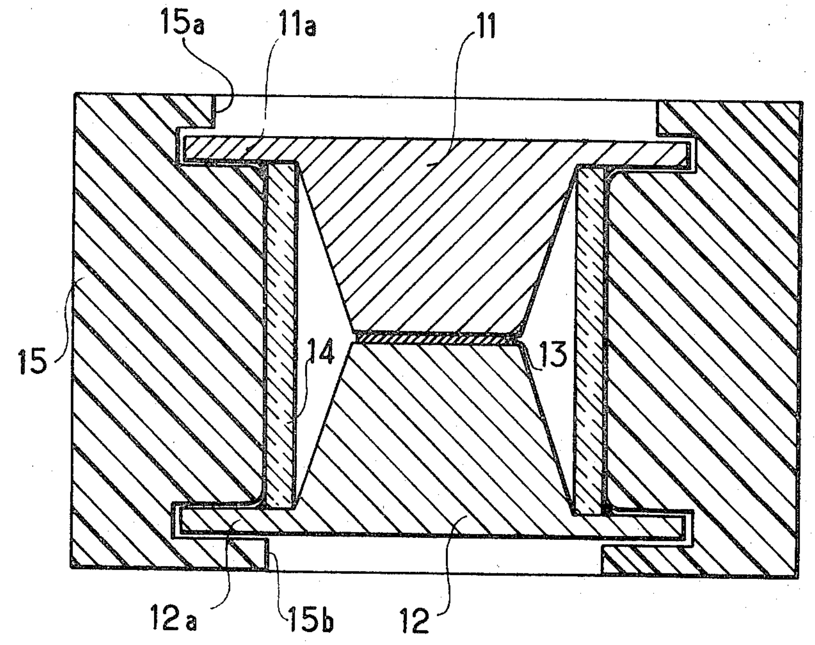

The invention relates to semiconductor components of general cylindrical form which include two external conductive surfaces connected by a fluid-tight insulating cylinder in particular to means for improving the dielectric strength.

Industry currently supplies semiconductor components operating at voltages of 1000 volts and above. Such operating conditions place severe requirements on the insulation between the electrodes. These requirements are satisfied inside the insulating cylinder wherein metallic portions are in contact with a semiconductor wafer (generally of silicon) with these parts surrounded by a fluid, generally imprisoned air. Precautions are taken in the manufacture to ensure that this air, which is quite dry, is free from ions and materials capable of creating ions. Its inherent dielectric strength, combined with the geometrical form of the component, ensures satisfactory interior dielectric strength under use.

The same is not true on the outside of the component. The external surface may be exposed to a moist or contaminated atmosphere. To ensure the essential dielectric strength under these disadvantageous conditions, without taking other precautions, it is necessary to increase enormously the distance between the electrodes, and the overall dimensions of the component then become prohibitive.

In order to obviate this difficulty, it is known to operate a high-voltage device, more particularly a semiconductor component, in a gas having high dielectric strength, for example sulphur hexafluoride, or in an insulating oil. Correct operation at high voltage is then obtained, with a component of minimum size.

A component designed for such applications may therefore be advantageously of small height. However, if the same component is to be employed in air in other applications, this may still be achieved by giving the insulation such a thickness that, on the one hand, the lines of force of the electric field which proceed from one electrode to the other through the outside of the component, pass mainly through an insulator having high dielectric strength, while on the other hand, the length of the surface leakage path is increased.

It would therefore be necessary to design two versions of one component: one form having "thin" insulation, suitable for use in a protective fluid, and one form having "thick" insulation suitable for use in an unprotected atmosphere.

Such duality is not industrially advantageous, since it necessitates setting up two chains of component manufacture and providing two stocks of components of two varieties in order to meet the customers' requirements.

It is more advantageous to manufacture a single component model having given operating characteristics.

Therefore, in accordance with the invention, in order to adapt a high-voltage semiconductor component having thin insulation to operation in an unprotected atmosphere requiring a thick insulator, the breakdown voltage between the electrodes is increased by applying around the original insulation a thicker insulating band completely covering the original insulation.

Figure 2:
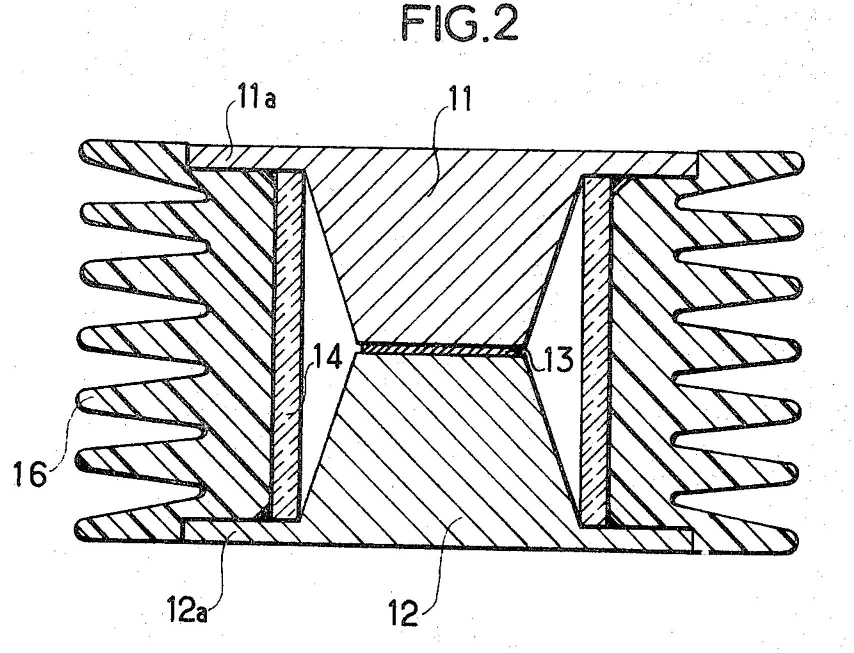

The invention will be described in greater detail by means of embodiments, which are given without limitation, with reference to the accompanying drawings, in which:

FIG. 1 is a simplified diagrammatic sectional illustration, to a large scale, of a semiconductor component manufactured with a thin insulation, which is protected by a reinforcing insulating band of a first form; and FIG. 2 is a similar view of the same component employing a reinforcing insulating band of a second form.

In FIGS. 1 and 2, a semiconductor component, for example a diode, comprises essentially two electrodes 11, 12 which sandwich between them, a semiconductor pellet 13 (for example of silicon) containing a PN junction. The diode also comprises assembly means and connecting means (not shown) which do not affect the definition of the invention.

The assembly is contained in an insulating torus or cylinder 14, generally formed of ceramics or of epoxy resin (registered trademark "Araldite"), to which the electrode flanges 11*a* and 12*a* are soldered. In FIG. 1, there has been added to the insulating ring 14, a thicker outer insulating ring or band 15 which surrounds the ring 14 and contacts the same. The edges 15*a*, 15*b* are formed by recesses which surround the electrode flanges 11*a* and 12*a*, respectively.

In FIG. 2, there is shown an applied insulating band 16, the outer surface of which is corrugated and which encloses the electrodes flanges 11*a*, 12*a*. In FIG. 2, like numerals identify like elements to the embodiment of FIG. 1.

The added insulation may be of the same nature as the original insulation, for example Araldite/Araldite, or it may be of another nature. For example, a polymerized elastomer may be molded around a ceramics ring.

For example, the following procedure may be adopted: A layer of liquid polymerizable elastomer dressing may be brushed onto the very clean ceramics, which has optionally been sanded in order to give it a rough surface to facilitate adherence. The polymerizable dressing product is allowed to dry for several minutes and then placed into a mold of appropriate shape with a "type A" catalyst for the polymerizable elastomer product. A product that polymerizes at ambient temperature in about 24 hours, and give a solid insulating product having good mechanical strength for withstanding a temperature of 250° C. would be satisfactory.

Of course, other methods may be adopted for the overmolding or application of the additional insulation within the scope of the invention.

While the invention has been particularly shown and described with reference to preferred embodiments thereof, it will be understood by those skilled in the art that various changes in form and details may be made therein without departing from the spirit and scope of the invention.

What is claimed is:

1. In a semiconductor component including two electrodes, a tube of electrical insulation, said electrodes having respective portions extending into said tube at opposite ends thereof and having opposing spaced surfaces within said tube, and a semiconductor body with opposite sides sandwiched between said surfaces, the improvement comprising: a band of electrical insulating material, thicker than said tube, in contact with and completely overlying the tube.

2. The semiconductor component of claim 1 wherein the external surface of the band is corrugated.

3. The semiconductor component of claim 1 wherein said electrodes are flanged and said insulation band surrounds the flanges which project radially beyond the ends of said tube.

4. The semiconductor component of claim 1 wherein the terminal edge of at least one electrode is covered by the insulation band.

References Cited

UNITED STATES PATENTS

| | | | |
|---|---|---|---|
| 1,649,741 | 11/1927 | Ruben | 317—234 |
| 2,907,935 | 10/1959 | Nagorsen | 317—234 |
| 3,193,366 | 7/1965 | Clark | 317—234 X |
| 3,226,610 | 12/1965 | Harman et al. | 317—234 |

JAMES D. KALLAM, Primary Examiner

U.S. Cl. X.R.

317—242